(12) United States Patent
Luss (10) Patent No.: US 8,320,274 B2
(45) Date of Patent: Nov. 27, 2012

(54) DISTRIBUTED METHOD FOR EQUITABLE BANDWIDTH ALLOCATION FOR CONTENT DISTRIBUTION IN A NETWORK

(75) Inventor: Hanan Luss, Marlboro, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 406 days.

(21) Appl. No.: 12/764,314

(22) Filed: Apr. 21, 2010

(65) Prior Publication Data
US 2011/0261703 A1  Oct. 27, 2011

(51) Int. Cl.
*H04L 12/26* (2006.01)
(52) U.S. Cl. .................................. 370/252; 370/468
(58) Field of Classification Search .................. None
See application file for complete search history.

(56) References Cited

U.S. PATENT DOCUMENTS

| | | | | |
|---|---|---|---|---|
| 5,946,321 | A * | 8/1999 | Dean | 370/451 |
| 6,986,156 | B1 | 1/2006 | Rodriguez et al. | |
| 7,339,897 | B2 | 3/2008 | Larsson et al. | |
| 7,664,020 | B2 | 2/2010 | Luss | |
| 2005/0213503 | A1 | 9/2005 | Guo et al. | |
| 2006/0153100 | A1 | 7/2006 | Dube et al. | |
| 2007/0104222 | A1* | 5/2007 | Luss | 370/468 |
| 2008/0198004 | A1* | 8/2008 | Luss | 340/539.26 |
| 2009/0157855 | A1* | 6/2009 | Adam et al. | 709/221 |
| 2009/0213875 | A1 | 8/2009 | Luss | |

OTHER PUBLICATIONS

Patent Cooperation Treaty International Search Report, Jul. 15, 2011.
Tang, Christopher S., "A Max-Min Allocation Problem: Its Solutions and Applications", Operations Research, vol. 36, No. 2, Mar.-Apr. 1988.
Lee, C.Y. et al., "Discrete bandwidth allocation considering fairness and transmission load in multicast networks", Computers & Operations Research, Elsevier Ltd, 2007, pp. 884-899.
Luss, Hanan, "An Algorithm for Separable Non-Linear Minimax Problems", Operations Research Letters, Elsevier Science Publishers B.V., North-Holland, vol. 6, No. 4, Sep. 1987.

(Continued)

*Primary Examiner* — Gregory Sefcheck
*Assistant Examiner* — Steve Young
(74) *Attorney, Agent, or Firm* — Philip J. Feig (57) ABSTRACT

A distributed method is presented for determining equitable bandwidth allocations in a content distribution tree network, where the root of the tree has a server that broadcasts multiple programs throughout the tree. The intensive computations in the distributed method are done at each of the nodes independently while only minimal information is exchanged among the nodes. Each network link has limited capacity. The allocation problem is formulated as an equitable resource allocation problem with a lexicographic maximin objective function that provides equitable service performance for all requested programs at the various nodes. The constraints include link capacity constraints and tree-like ordering constraints imposed on each of the programs. The distributed method converges to the equitable solution in a finite number of iterations. The distributed method can be applied to a network comprised of multiple trees.

15 Claims, 2 Drawing Sheets

OTHER PUBLICATIONS

Luss, Hanan, "A nonlinear minimax allocation problem with multiple knapsack constraints", Operations Research Letters 10, Elsevier Science Publishers B.V., North-Holland, Jun. 1991.

Luss, Hanan, "On equitable resource allocation problems: a lexicogrphic minimax approach", Operations Research, Informs, vol. 47, No. 3, May-Jun. 1999.

Luss, Hanan "An Equitable Bandwidth Allocation Model for Video-on-Demand Networks", Spring Science & Business Media, LLC., Dec. 28, 2007.

Luss, Hanan, "Equitable Bandwidth Allocation in Content Distribution Networks", Wiley Periodicals, Inc., 2010.

Luss, H., et al., "Resource Allocation Among Competing Activities: A Lexicographic Minimax Approach", Operations Research Letters, Elsevier Science Publishers B.V., North-Holland, vol. 5, No. 5, Nov. 1986.

Sarkar, S., et al., "Distributed Algorithms for Computation of Fair Rates in Multirate Multicast Trees", IEEE INFOCOM 2000.

Sarkar, S., et al., "Fair Bandwidth Allocation for Multicasting in Networks with Discrete Feasible Set", IEEE Transactions on Computers, IEEE, vol. 53, No. 7, Jul. 2004.

Lee, C.Y., et al., "A lexicographically fair allocation of discrete bandwidth for multirate multicast traffics", Computers & Operations Research 31, Elsevier Ltd., 2004, pp. 2349-2363.

* cited by examiner

DISTRIBUTED METHOD FOR EQUITABLE BANDWIDTH ALLOCATION FOR CONTENT DISTRIBUTION IN A NETWORK

FIELD OF THE INVENTION

The present invention relates to content distribution networks. Specifically, the invention relates to the allocation of available bandwidth for content distribution using distributed decisions that are computed independently at multiple nodes of a network.

BACKGROUND OF THE INVENTION

Many telecommunications network service providers, cable TV operators, and telecommunications equipment providers are showing significant interest in provisioning content distribution services such as Video-on-Demand (VOD). Primary application areas include on-demand home entertainment, remote learning and training, video conferencing, and news-on-demand. These services are expected to grow significantly over time and become an important source of income for the service providers. However, in order to provide adequate service, significant bandwidth resources must be available, which implies large capital investment. For example, in near-VOD applications a server may broadcast a copy of a popular movie every five minutes which implies that a customer may wait, on average, 2.5 minutes. Thus, if the length of the movie is 100 minutes, the network would carry simultaneously 20 copies of the movie, which would require significant bandwidth resources. The available bandwidth resources in the network will dictate the service provided in near-VOD applications in terms of the waiting time for customers for the next copy of the movie. In other delivery technologies that provide almost instantaneous VOD delivery, bandwidth allocation to any program can be controlled by changing the video quality provided to users. The quality expected by customers may depend on the application. For example, broadcasting of movies requires better video quality than multicasting of video conferences.

Consider a tree network with directed links where the root node of the tree has a server that stores and broadcasts multiple programs to serve requests for programs at multiple nodes of the tree. Since the bandwidth capacity of each link is limited, prudent allocation of bandwidth is needed in order to serve adequately all requested programs at the various nodes. In particular, it is important to achieve an equitable allocation of bandwidth among the various programs along all links of the tree network. This is a challenging objective since the bandwidth allocated on a link for a specific program may decrease from one link to the next in a path from the root node to an end-node, but may not increase.

Several methods that allocate the bandwidth in a tree network have been published. S. Sarkar and L. Tassiulas, Distributed Algorithms for Computation of Fair Rates in Multirate Multicast Trees, *Proceedings of IEEE INFOCOM* 2000, 52-62, Tel Aviv, March, 2000 propose a method for equitable allocation along the links of the tree for linear performance functions, representing throughput. S. Sarkar and L. Tassiulas, Fair Bandwidth Allocation for Multicasting in Networks with Discrete Feasible Set, *IEEE Transactions on Computers* 53, 785-797, 2004 extend the model to discrete bandwidth allocation. The extended model is an NP-complete problem and the authors provided an algorithm for a simplified objective function that approximates an equitable solution. C. Y. Lee, Y. P. Moon, and Y. J. Cho, A Lexicographically Fair Allocation of Discrete Bandwidth for Multirate Multicast Traffics, *Computers and Operations Research* 31, 2349-2363, 2004 and C. Y. Lee and H. K. Cho, Discrete Bandwidth Allocation Considering Fairness and Transmission load in Multicast Networks, *Computers and Operations Research* 34, 884-899, 2007 also provide algorithms for the discrete allocation case. They provide heuristics to an objective function that approximates equitable solutions. All the references above present algorithms limited to finding equitable throughput. These algorithms use bandwidth allocated to source-destination (also referred to as "virtual sessions") as decision variables H. Luss, An Equitable Bandwidth Allocation Model for Video-on-Demand Networks, *Networks and Spatial Economics*. 8, 23-41, 2008. (Also, H. Luss, "Bandwidth Allocation for Video-on-Demand Networks", U.S. Pat. No. 7,664,020) presents an algorithm for the same equitable bandwidth allocation problem, but which is formulated differently. The decision variables are the bandwidth allocations to the programs on a link (regardless of the destination). The decision variables for each program must satisfy tree-like ordering constraints that ensure, for each program, that the bandwidth allocated cannot increase from one link to the next when moving farther away from the root node. The model assumes general performance functions for each program (continuous, strictly increasing, but not necessarily linearly) that may also depend on the receiving node. Nonlinear performance functions are important since they may, for example, represent diminishing rates of increase in satisfaction when the provided bandwidth is increased.

H. Luss, Equitable Bandwidth Allocation in Content Distribution Networks, *Naval Research Logistics*, published online, DOI 10.1002/nav.20400, January 2010 (also, H. Luss, "Method for Equitable Bandwidth Allocation for Content Distribution Networks", U.S. Patent Application Publication No. 2009/0213875) assumes that the performance functions may depend on the program, but for any specific program they are the same at all nodes. Luss provides an algorithm which results in an optimal solution in polynomial time for linear and for certain nonlinear performance functions. The algorithm can be used for even more general performance functions though the computation time then depends on the required accuracy of the solution.

Note that in some of the references, the underlying problem is described in terms of multiple multicasting sessions, while other references describe the underlying problem as broadcasting of multiple programs. Nevertheless, these problems are essentially the same.

In the present invention the algorithm in the last mentioned reference (Luss 2010) is extended to a distributed environment where the intensive computations are done at each of the nodes independently while only minimal information is exchanged among the nodes. A distributed method is attractive as it eliminates the need for a central computing device. It also facilitates very quick adaptation to changes over time, such as introduction of new programs and deletion of existing programs.

SUMMARY OF THE INVENTION

The present invention provides a distributed method for optimal allocation of bandwidth available on each link of a tree network where the root of the tree has a server that broadcasts multiple programs throughout the tree. In the distributed method, the intensive computations are done at each of the nodes independently while only minimal information is exchanged among the nodes. The links have limited capacity; hence, prudent bandwidth allocation decisions must be made for each program on each of the relevant links. The bandwidth allocation problem is formulated as an equitable resource allocation problem with a lexicographic maximin objective function that provides equitable service performance for all requested programs at the various nodes. The constraints include link capacity constraints and tree-like ordering constraints imposed on each of the programs. The ordering constraints ensure that, for each program, the bandwidth allocated cannot increase from one link to the next when moving farther away from the root node.

H. Luss, Equitable Bandwidth Allocation in Content distribution Networks, *Naval Research Logistics*, published online, DOI 10.1002/nav.20400, January 2010 (also, U.S. Patent Application Publication No. 2009/0213875) provides an algorithm that determines the lexicographic maximin solution. The current invention extends that of Luss 2010 so that the algorithm can be executed in a distributed environment where the intensive computations are done at each of the nodes independently while only minimal information is exchanged among the nodes. A distributed method is attractive as it eliminates the need for a central computing device. It also facilitates very quick adaptation to changes over time, such as introduction of new programs and deletion of existing programs, as computations at different nodes can be done in parallel.

The major steps of the distributed method are as follows: Initially, the sets of programs carried on each of the links from the node are derived using recursive computations. Next, at each node, proposed bandwidth allocations on each of its outgoing links are computed, ignoring the tree-like ordering constraints among links. These distributed computations are executed independently at each of the nodes for each of its outgoing links. Next, a bottleneck link is determined through exchange of information. This is followed by determination of optimal bandwidth allocations on the bottleneck link. These fixed decisions may lead to further fixing of optimal bandwidth allocation decisions on other links so that the tree-like ordering constraints will be satisfied. The method then proceeds with a new iteration of distributed computations at a subset of nodes where previously proposed bandwidth allocation decisions are modified. The method terminates once all bandwidth allocation decisions on all links are fixed. The optimal solution is obtained by the distributed method in a finite number of iterations.

The present invention will be more clearly understood when the following description is read in conjunction with the accompanying drawings.

DETAILED DESCRIPTION

Figure 1:
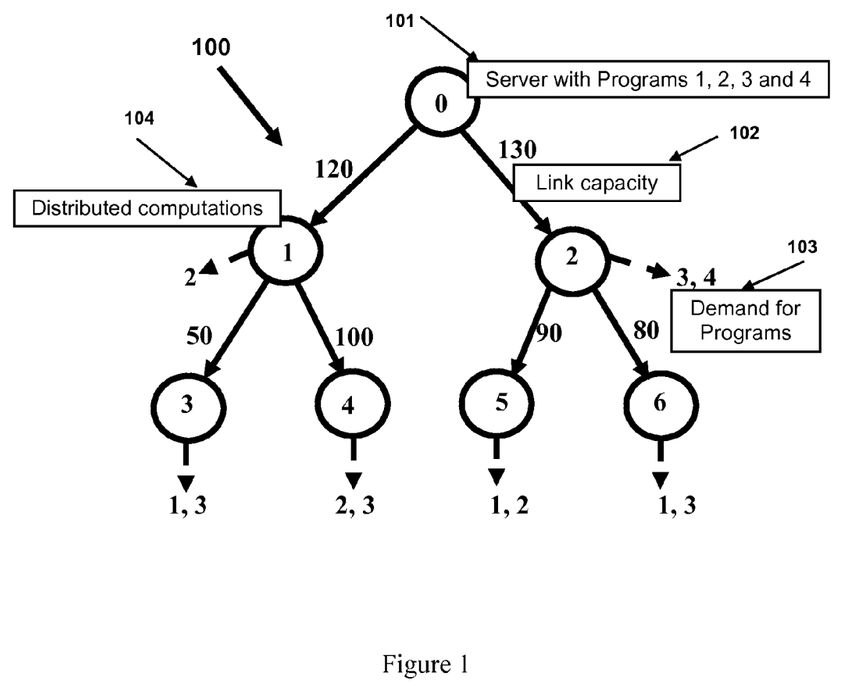
FIG. 1 shows an example of the bandwidth allocation problem for a content distribution tree network with a server at the root of the tree broadcasting multiple programs.

Referring now to the figures and to FIG. 1 in particular, there is shown an example 100 of a tree network comprising seven nodes (0, 1, 2, 3, 4, 5, 6) with directed links. The root node (node 0) has a server that stores and broadcasts multiple program. In the present example programs 1, 2, 3 and 4 (101) serve requests for programs at multiple nodes. The numbers along the links are the bandwidth capacity of the link available for broadcasting. Thus link (0, 2) has capacity of 130 units (e.g., Mbps) (102). Each of the nodes, in the present example, 1, 2, 3, 4, 5 and 6, may have demand for some programs (there may be nodes with no demand). For instance, node 2 has demand for programs 3 and 4 (103). Since the bandwidth capacity of each link is limited, prudent allocation of bandwidth is needed in order to serve adequately all requested programs at the various nodes. Note that the links are directed for broadcasting purposes; however, the information exchanged executed by the method between nodes can be in both directions. The intensive computations executed to determine bandwidth allocation are executed independently at each of the nodes, while exchanging only minimal amount of information among the nodes. To this end preferably there is a computing means located at each node to perform the calculations. Specifically, these computations are made by the tail node of each of the links (104). Thus, for example, node 1 would make computations for links (1, 3) and (1, 4). Note that the bandwidth allocated to a link for a specific program may decrease from one link to the next in a path from the root node to an end-node, but may not increase. These constraints are expressed as tree-like ordering constraints which are ignored during the intensive computations executed independently at the nodes. Nevertheless, these ordering constraints must be satisfied upon termination of the algorithm. The example of FIG. 1 will be used in the following description for explaining the distributed method of the present invention. It will be understood that the foregoing description is for illustrative purposes and not as a limitation on the invention.

Satisfaction from the delivery quality of a requested program at a node is specified through a performance function that is continuous, strictly increasing with the bandwidth allocated to that program on the incoming link into the node. For example, the performance function for program 1 and the bandwidth allocated to program 1 on link (2, 6) determine the satisfaction value at node 6 for program 1. The objective is to allocate the bandwidth in an equitable way; i.e., the objective is to determine the lexicographic largest feasible vector of the performance function values, where the elements of this vector are sorted in a non-decreasing order. Intuitively, for continuous decision variables, an equitable solution is such that none of the performance function values can be feasibly increased without decreasing the value of some performance function whose value before the decrease does not exceed the value of the former one before the increase. H. Luss, On Equitable Resource Allocation Problems: A Lexicographic Minimax Approach, *Operations Research* 47, 361-378, 1999 presents an expository paper on equitable resource allocation problems. Note that a feasible solution must satisfy the capacity constraints as well as ordering constraints that ensure that the bandwidth allocated to a specific program cannot increase from one link to the next along a path away from the root node. Other constraints can also be imposed such as lower and upper bounds for bandwidth allocated to a specific program on any of the links that carry that program.

Mathematical formulation of the equitable bandwidth allocation problem is provided below. Consider a tree network $T(N, A)$, where N is a set of nodes and A is a set of interconnecting directed links. Nodes are represented by indices $i$, $j$ and $k$ and links are represented by the doubleton of end-nodes $(i, j)$ where $i$ is the tail node of the link and $j$ is the head node. Link $(i, j)$ has a capacity limit $c(i, j)$ of available bandwidth. A server is located at the root node with program set P. Programs are represented by the index p. Each of the nodes $i \in N\backslash 0$ (i.e., nodes in N except for node 0) has a demand for a subset of programs $P_i$, $P_i \in P$, where $P_i$ may be empty (programs requested at the root node are not considered since they are served directly without using any link bandwidth). To illustrate the notation, consider FIG. 1. The set of nodes is N={0, 1, . . . , 6}, the set of links is A={(0, 1), (0, 2), (1, 3), (1, 4), (2, 5), (2, 6)}, and the set of programs is P={1, 2, 3, 4}. For convenience, the nodes in N are numbered so that in any link (i, j), j>i, the link capacities are c(0, 1)=120, c(0, 2)=130, c(1, 3)=50, c(1, 4)=100, c(2, 5)=90 and c(2, 6)=80.

Let the set NP={(j, p)|p∈$P_j$, j∈N}; i.e., doubleton (j, p)∈NP if program p is requested at node j. In FIG. 1, NP={(1, 2), (2, 3), (2, 4), (3, 1), (3, 3), (4, 2), (4, 3), (5, 1), (5, 2), (6, 1), (6, 3)}.

In the distributed algorithm, each node is aware of its local environment; i.e., of the incoming links and outgoing links, the capacity of each of the outgoing link, and the programs requested at the node. For example, in FIG. 1, node 2 is aware of incoming link (0, 2), outgoing links (2, 5) (with capacity 90) and (2, 6) (with capacity 80), and of the programs requested at node 2 (programs 3 and 4). Let $D_{(i,j)}$ be the set of programs that are carried on link (i, j). For example, $D_{(0,1)}$={1, 2, 3} and $D_{(1,4)}$={2, 3}. As will be shown later, in the distributed algorithm the set $D_{(i,j)}$ will be computed at node j and provided from there to node i. Node i executes the distributed computations for bandwidth allocation on link (i, j). Note that the programs are broadcasted along the directed links. The distributed algorithm requires, though, exchange of certain information in both directions. It is assumed that the tree network has the capability of moving this information along the directed links as well as along the opposite direction.

Decision Variables and Performance Functions $x_{(i,j)p}$=Bandwidth allocated on link (i, j) for program p where $x_{(i,j)p}$ is continuous, and $x_{(i,j)p} \geq B_p$ where $B_p$ is a lower bound for bandwidth required by program p. For example, link (0, 2) in FIG. 1 allocates bandwidth to programs 1, 2, 3 and 4, where program 1 is requested at nodes 5 and 6, program 2 at node 5, program 3 at nodes 2 and 6, and program 4 at node 2.

x=Vector of decision variables $x_{(i,j)p}$(j, p)∈NP.

$F_{jp}(x_{(i,j)p})$=Performance function associated with program p requested at node j, where $x_{(i,j)p}$ is the bandwidth allocated to program p on link (i, j) and, hence, into node j. For example, at node 5 of FIG. 1, the performance functions are $F_{51}(x_{(2,5)1})$ and $F_{52}(x_{(2,5)2})$. A performance function represents the satisfaction of customers with bandwidth $x_{(i,j)p}$ for program p at node j. $F_{jp}(x_{(i,j)p})$ is assumed to be a continuous, strictly increasing function. It is also assumed that for any specific program p, $F_{jp}(x_{(i,j)p})$ is the same at all nodes with a demand for program p. Hence, the notation of the performance functions is simplified to $F_p(X_{(i,j)p})$.

Note that linear performance functions are only one reasonable way to measure satisfaction. For example, concave performance functions (such as a logarithmic function) may often, depending on the specific application, be more appropriate as they express diminishing rate of increase in satisfaction when the provided bandwidth is increased.

The bandwidth allocation problem must satisfy various constraints. The total bandwidth allocated to all programs carried on each of the links cannot exceed the available bandwidth capacity, while the bandwidth allocated to each of the programs must satisfy the lower bound. In addition, the bandwidth allocated for any program p on link (i, j) must be at least as large as the bandwidth allocated to program p on all outgoing links from node j that carry program p. The latter constraints are expressed as tree-like ordering constraints.

The objective is to determine equitable bandwidth allocations for all (j, p)∈NP, while satisfying all the constraints. Consider the vector of all performance function values, $F_p(x_{(i,j)p})$, for all (j, p)∈NP, sorted in non-decreasing order. An equitable solution is defined as a solution that provides the lexicographic largest vector of these ordered performance function values.

Let $F^{(NP)}(x)$ be a vector of performance functions $F_p(x_{(i,j)p})$ for all (j, p)∈NP, where for a given vector x these performance functions are sorted in a non-decreasing order. Thus, $$F^{(NP)}(x)=[F_{p_1}(x_{(i_1,j_1)p_1}), F_{p_2}(x_{(i_2,j_2)p_2}), F_{p_3}(x_{(i_3,j_3)p_3}), \ldots ], \quad (1.1)$$

where $$F_{p_1}(x_{(i_1,j_1)p_1}) \leq F_{p_2}(x_{(i_2,j_2)p_2}) \leq F_{p_3}(x_{(i_3,j_3)p_3}) \leq \ldots \quad (1.2)$$

An equitable solution is the lexicographic largest vector $F^{(NP)}(x)$ that satisfies all the constraints. An equitable solution implies that no performance function value of any demand can be feasibly improved without degrading an already equally poor or worse-off performance function value of another demand. The resulting problem is called a lexicographic maximin optimization problem. The lexicographic maximin solution extends the notion of a maximin solution as we are required to maximize not only the smallest performance function value, but also the second smallest one, the third smallest one, and so forth.

The Equitable Bandwidth Allocation Model (Problem EBAM) is now formulated as a lexicographic maximin optimization problem. Some more notations are added. Let SUC (j) be the set of immediate successor nodes of node j; for example in FIG. 1, SUC(2)={5, 6}. Let the set LP={[(i, j), p]|p∈$D_{(i,j)}$, (i, j)∈A}; i.e., doubleton [(i, j), p]∈LP if program p is carried on link (i, j). In FIG. 1, LP={[(0, 1), 1], [(0, 1), 2], [(0, 1), 3], [(0, 2), 1], [(0, 2), 2], [(0, 2), 3], [(0, 2), 4], [(1, 3), 1], [(1, 3), 3], [(1, 4), 2], [(1, 4), 3], [(2, 5), 1], [(2, 5), 2], [(2, 6), 1], [(2, 6), 3]}.

Problem EBAM $$V^{LEX} = \operatorname*{lexmax}_{x}[F^{(NP)}(x)] \quad (2.1)$$

so that (1.1) and (1.2) are satisfied, and $$\sum_{p \in D_{(i,j)}} x_{(i,j)p} \leq c(i, j), \text{ for all } (i, j) \in A \quad (2.2)$$

$$x_{(i,j)p} \geq x_{(j,k)p}, \text{ for all } k \in SUC(j) \text{ and } p \in D_{(j,k)}, \text{ for all } [(i, j), p] \in LP \quad (2.3)$$

$$x_{(i,j)p} \geq B_p, \text{ for all } [(i, j), p] \in LP. \quad (2.4)$$

It is assumed that $\sum_{p \in D_{(i,j)}} B_p \leq c(i, j)$ for all (i, j)∈A so that a feasible solution for Problem EBAM exists. Objective function (2.1) (with (1.1) and (1.2)) specifies the vector that provides the equitable solution. Constraints (2.2) enforce the bandwidth capacity constraint on each of the links. Constraints (2.3) enforce the ordering constraints that ensure, for each program, that the bandwidth allocated cannot increase from one link to the next when moving farther away from the root node. Constraints (2.4) enforce lower bounds on bandwidth allocation. Since Problem EBAM has a feasible solution and the resource constraints (2.2) have only positive coefficients, it can readily be shown that an equitable solution exists. The optimal value of the decision variables are denoted by superscript L.

At the heart of the distributed algorithm is the repeated solution of a single link bandwidth allocation problem. This problem will be solved one or more times at each of the nodes, excluding the leaf nodes of the tree network. In FIG. 1, such problems will be solved at nodes 0, 1 and 2. The formulation of the Single-Link Bandwidth Allocation Model for link (i, j), referred to as Problem SLBAM-(i, j) is as follows:

Problem SLBAM-(i, j)

$$V^*_{(i,j)} = \max_{x_{(i,j)}} \left[ \min_{p \in D_{(i,j)}} F_p(x_{(i,j)p}) \right] \quad (3.1)$$

so that $$\sum_{p \in D_{(i,j)}} x_{(i,j)p} \leq c(i, j) \quad (3.2)$$

$$x_{(i,j)p} \geq B_p, \text{ for all } p \in D_{(i,j)}. \quad (3.3)$$

Note that Problem SLBAM-(i, j) does not include any ordering constraints. Let $T_j$ be the subtree of T(N, A) with node j as the root, and starting from there it includes nodes that can be reached from node j and the corresponding links. For example, in FIG. 1, $T_2$ includes nodes 2, 5 and 6, and links (2, 5) and (2, 6). Obviously, $T_0$ is the entire tree. Consider a specific link (i, j). Note that objective function (3.1) includes a performance function for every program p carried on that link regardless of where the demand for that program exists in the nodes of subtree T. For example, the objective function of Problem SLBAM-(0, 2) in FIG. 1 considers programs 1, 2, 3 and 4 although programs 1 and 2 are not requested at node 2. The optimal variable values are denoted by superscript *.

Problem SLBAM-(i, j) has been studied extensively and various efficient algorithms that solve this problem have been published. The algorithms in the references below solve more general problems with multiple resource constraints (instead of a single resource constraint (3.2)) of the form $\Sigma_n a_{mn} x_{mn} \leq c_m$ for all m where all $a_{mn} \geq 0$ and all $c_m \geq 0$ are given parameters (m is an index for resources). H. Luss and D. R. Smith, Resource Allocation Among Competing Activities: A Lexicographic Minimax Approach, *Operations Research Letters* 5, 227-231, 1986 and C. S. Tang, A Max-MM Allocation Problem: Its Solutions and Applications, *Operations Research* 36, 359-367, 1988 provide algorithms for linear performance functions. H. Luss, An Algorithm for Separable Non-Linear Minimax Problems, *Operations Research Letters* 6, 159-162, 1987 provides an algorithm for certain non-linear, continuous, strictly increasing performance functions where the solution of a relaxed version of Problem SLBAM-(i, j) without the lower bound constraints (3.3) can be achieved through the computation of closed-form expressions. H. Luss, A Nonlinear Minimax Allocation Problem with Multiple knapsack Constraints, *Operations Research Letters* 10, 183-187, 1991 provides an algorithm for more general nonlinear, continuous, strictly increasing performance functions. These algorithms can also be used to compute a new optimal solution when the problem is slightly revised (e.g., a new program is added) without having to repeat all computations. This material is also discussed in H. Luss, On Equitable Resource Allocation Problems: A Lexicographic Minimax Approach, *Operations Research* 47, 361-378, 1999. Note that Problem SLBAM-(i, j) is often formulated as a minimax optimization problem with strictly decreasing performance functions, and the same algorithms apply.

Figure 2:
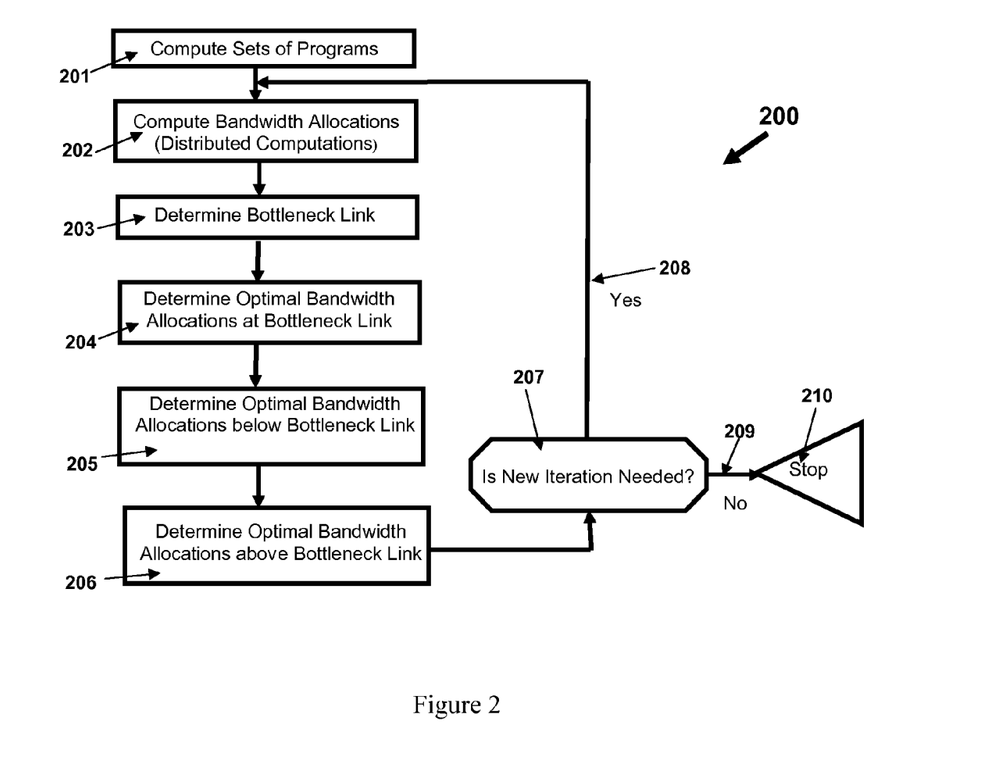
FIG. 2 is a flow chart of the distributed method embodying the present invention that determines equitable bandwidth allocation for content distribution in a tree network.

Referring now to FIG. 2, there is shown a flow chart 200 of a distributed method of the current invention that solves Problem EBAM in a distributed way, meaning that the intensive computations are done at each of the nodes independently from all other nodes while only minimal information is exchanged among the nodes of the tree network. The method is referred to as the DISTRIBUTED METHOD FOR EBAM. Each of the method steps is described below.

Distributed Method for EBAM

Compute Sets of Programs (201)

Each node i∈N (except for the end nodes of the tree) is responsible for distributed computation for each of the outgoing links from the node. To that end, node i must have available sets $D_{(i,j)}$ for each j∈SUC(i). Let LEAF be the set of leaf nodes in T(N, A) (in FIG. 1, LEAF={3, 4, 5, 6}) and let pre(j) be the predecessor node of node j (for example, in FIG. 1, node 2=pre(5)).

Starting from the leaf nodes j ∈ LEAF, the recursive equations below are used to compute the set $D_{(i,j)}$ at node j for i=pre(j). Node i then receives set $D_{(i,j)}$ from each node j∈SUC (i). Once node 0 receives the sets from all its successor nodes, the computations are completed. The recursive equations are:

$$D_{(pre(j),j)} = P_j, \text{ for all } j \in \text{LEAF} \quad (4.1)$$

$$D_{(pre(j),j)} = P_j \cup (\cup_{k \in SUC(j)} D_{(j,k)}), \text{ for all } j \in N \setminus (\text{LEAF} \cup 0). \quad (4.2)$$

Consider FIG. 1. From equation (4.1), $D_{(2,6)}=\{1, 3\}$, $D_{(2,5)}=\{1, 2\}$, $D_{(1,4)}=\{2, 3\}$, and $D_{(1,3)}=\{1, 3\}$.

$D_{(2,6)}$ and $D_{(2,5)}$ are sent to node 2 and $D_{(1,4)}$ and $D_{(1,3)}$ are sent to node 1.

Node 2 computes, using equation (4.2), $D_{(0,2)}=P_2 \cup (D_{(2,6)} \cup D_{(2,5)})=\{1, 2, 3, 4\}$.

Node 1 computes, using equation (4.2), $D_{(0,1)}=P_1 \cup (D_{(1,4)} \cup D_{(1,3)})=\{1, 2, 3\}$.

Node 2 and node 1 send the information to node 0, and the computation and dissemination of the information is completed.

Compute Bandwidth Allocations (Distributed Computations) (202)

At each node i∈N\LEAF, solve Problem SLBAM-(i, j) for each j∈SUC(i). The problem is solved using known methods for which references were previously provided.

Consider FIG. 1. Suppose the performance functions are: $F_1(y)=F_4(y)=2y$, and $F_2(y)=F_3(y)=y$, where y is a generic argument, Suppose the lower bounds are $B_1=30$ and $B_2=B_3=B_4=0$. The solutions of problems executed at each node are given below.

Node 1: Solution for link (1, 3) is: $V^*_{(1,3)}=20$, $x^*_{(1,3)1}=30$, $x^*_{(1,3)3}=20$;

Solution for link (1, 4) is: $V^*_{(1,4)}=50$, $x^*_{(1,4)2}=50$, $x^*_{(1,4)3}=50$.

Node 2: Solution for link (2, 5) is: $V^*_{(2,5)}=60$, $x^*_{(2,5)1}=30$, $x^*_{(2,5)2}=60$;

Solution for link (2, 6) is: $V^*_{(2,6)}=50$, $x^*_{(2,6)1}=30$, $x^*_{(2,6)3}=50$.

Node 0: Solution for link (0, 1) is: $V^*_{(0,1)}=45$, $x^*_{(0,1)1}=30$, $x^*_{(0,1)2}=45$, $x^*_{(0,1)3}=45$;

Solution for link (0, 2) is: $V^*_{(0,2)}=40$, $x^*_{(0,2)1}=30$, $x^*_{(0,2)2}=40$, $x^*_{(0,2)3}=40$, $x^*_{(0,2)4}=20$.

Determine Bottleneck Link (203)

The bottleneck link is the link that yields the smallest value of $V^*_{(i,j)}$. Let $F_k$ be the smallest value of $V^*_{(i,j)}$ among the links in subtree $T_k$ and let $b(T_k)$ be the bottleneck link among the links in $T_k$. The bottleneck link $b(T_0)=(i_0, j_0)$ for the entire tree network $T_0$ is determined using the recursive equations below, starting computation from the leaf nodes and moving upwards along the tree nodes.

$$F_k = \infty, \text{ for all } k \in \text{LEAF} \qquad (5.1)$$

$$F_k = \min\left[\min_{j \in SUC(k)} F_j, \min_{j \in SUC(k)} V^*_{(k,j)}\right], \text{ for all } k \in N \setminus \text{LEAF}. \qquad (5.2)$$

Since nodes $k \in \text{LEAF}$ do not have outgoing links, the corresponding values of $F_k$ are set equal to infinity. The bottleneck link in $T_k$ is identified in equation (5.2). If the minimum is from among the first term in the brackets, say for $j_1$; then the bottleneck link is $b(T_k)=b(T_{j_1})$. If the minimum is from among the second term in the bracket, say for $j_2$; then the bottleneck link is $b(T_k)=(k,j_2)$.

Consider FIG. 1. $F_6 = F_5 = F_4 = F_3 = \infty$.
$F_2 = \min[\infty, \min(60, 50)] = 50$ and the bottleneck link of $T_2$ is $(2, 6)$.
$F_1 = \min[\infty, \min(20, 50)] = 20$ and the bottleneck link of $T_1$ is $(1, 3)$.
$F_0 = \min[\min(20, 50), \min(45, 40)] = 20$ and the bottleneck link of $T_0$ is $(1, 3)$.

Once node 0 determines the bottleneck $(i_0, j_0) = (1, 3)$, it sends this information to node $i_0 = 1$.

Determine Optimal Bandwidth Allocations at Bottleneck Link (204)

Suppose bottleneck link is $(i_0, j_0)$. Node $i_0$ fixes the optimal allocations on link $(i_0, j_0)$ as follows (recall that superscript L denotes optimal equitable allocations):

$$x_{(i_0, j_0)p}^L = x_{(i_0, j_0)p}^*, \text{ for all } p \in D_{(i_0, j_0)}, \qquad (6)$$

where the single link optimal values $x^*_{i_0, j_0, p}$ were determined in Step 202 as the solution of Problem SLBAM-$(i_0, j_0)$. The programs with fixed bandwidth on the link are then deleted from $D_{i_0, j_0}$. Thus, $D_{i_0, j_0} = \emptyset$ and all decisions for link $(i_0, j_0)$ are completed. Node $i_0$ notifies node 0 that decisions for this link are completed.

Although in Problem EBAM, as formulated by (1.1)-(1.4), all bandwidth allocation decisions will be fixed on link $(i_0, j_0)$, there exist variants of this formulation where not all the variables at the bottleneck link are fixed at their optimal values. Examples will be presented later. In the example of FIG. 1 with $(i_0, j_0) = (1, 3)$, node 1 fixes allocations on link (1, 3). Specifically, $x_{(1,3)1}^L = 30$ and $x_{(1,3)3}^L = 20$.

Determine Optimal Bandwidth Allocations Below Bottleneck Link (205)

Consider tree $T_{j_0}$ (recall that in Step 204 link $(i_0, j_0)$ was identified as the bottleneck link). Every program fixed on link $(i_0, j_0)$ will be fixed at the same value on all other links in $T_{j_0}$ that carry that program. Thus, $$x_{(i,j)p}^L = x_{(i_0, j_0)p}^L \text{ for any } (i,j) \in T_{j_0} \text{ where } p \in D_{(i,j)}, \text{ for all } p \in D_{(i_0, j_0)}. \qquad (7)$$

Starting from node $i_0$, the relevant information is sent from one node to the next to all nodes in tree $T_{j_0}$. Any fixed variable is deleted from the corresponding set $D_{(i,j)}$. If $D_{(i,j)} = \emptyset$, the corresponding node i notifies node 0 that all decisions on that link are completed. Note that in Problem EBAM, as formulated by (2.1)-(2.4), all variables are fixed in this step on each of the links in $T_{j_0}$ (other cases are discussed later).

In the example of FIG. 1, link (1, 3) has no outgoing link, so this step is not executed. Examples for this step will be shown later in Table 1 and Table 2.

Determine Optimal Bandwidth Allocations Above Bottleneck Link (206)

Some allocation decisions may also be fixed on links that connect nodes 0 and $i_0$. Consider some link (i, j) along that path, If the allocation for program p was fixed on link $(i_0, j_0)$ and p is not requested by any node of T except for nodes in $T_{j_0}$, then the optimal allocation on all links that connect node i to node $i_0$ is the same as the allocation to that program on link $(i_0, j_0)$. These decisions are done using the procedure described below (referred to as Procedure FIXABOVE) for one link at a time, starting at link (pre$(i_0)$, $i_0$) and proceeding backwards towards node 0.

---

Start of Procedure FIXABOVE

Determine the set CANDIDATE = $\{p \mid$ programs p whose allocations were fixed on link$(i_0, j_0)\}$.
If $i_0 = 0$, stop.
Let $j_t \leftarrow i_0$.
While $j_t \neq 0$,
  Let $i_t \leftarrow$ pre$(j_t)$.
  For p $\in$ CANDIDATE
    If p $\in P_{j_t} \cup (\cup_{k \in SUC(j_t)} D_{(j_t, k)})$, then delete p from CANDIDATE; otherwise fix
    $x_{(i_t, j_t)p}^L = x_{(i_0, j_0)p}^L$ and delete p from $D_{(i_t, j_t)}$.
  End.
  If $D_{(i_t, j_t)} = \emptyset$, notify node 0 that allocations on link $(i_t, j_t)$ are completed.
  If CANDIDATE = $\emptyset$, stop; notify node 0 that no more variables can be fixed.
  Let $j_t \leftarrow i_t$.
End.
End of Procedure.

---

If $D_{(i,j)} = \emptyset$, the corresponding node i notifies node 0 that all decisions on that link are completed. Recall that in the example of FIG. 1 $(i_0, j_0) = (1, 3)$; thus, node 1 fixes allocations on link (1, 3). Specifically, $x_{(1,3)1}^L = 30$ and $x_{(1,3)3}^L = 20$. The preceding link is link (0, 1). Since link (1, 4) carries programs 2 and 3 and node 1 requests only program 2, program 1 can be fixed on link (0, 1) but not programs 2 or 3. Thus, $x_{(0,1)1}^L = 30$.

Initiate New Iteration if Needed (207-210)

Once all allocation decisions that could be made are completed, node 0 is aware whether all links completed allocation decisions or not.

If some links have not completed all allocations (207), a new iteration is initiated (208). Note that all sets $D_{(i,j)}$ have already been updated. The new iteration starts with re-solving Problems SLBAM-(i, j) (202) for links with updated $D_{(i,j)} \neq \emptyset$ where links whose sets $D_{(i,j)}$ have not changed need not be re-solved.

Once all allocation have been completed on all links, the solution for Problem EBAM is obtained (209, 210) and the distributed algorithm terminates with an equitable bandwidth allocation on all links. The table below shows the bottleneck links and program allocations at each of the iterations for the example of FIG. 1.

TABLE 1

| iteration | Bottleneck link $(i_0, j_0)$ | Bottleneck Link Solution $V_{(i_0, j_0)}^*$ | Optimal Allocation Decisions |
|---|---|---|---|
| 1 | (1, 3) | 30 | $x_{(1,3)1}^L = 30$, $x_{(1,3)3}^L = 20$, $x_{(0,1)1}^L = 30$ |
| 2 | (0, 2) | 40 | $x_{(0,2)1}^L = 30$, $x_{(0,2)2}^L = 40$, $x_{(0,2)3}^L = 40$, $x_{(0,2)4}^L = 20$, $x_{(2,5)1}^L = 30$, $x_{(2,5)2}^L = 40$, $x_{(2,6)1}^L = 30$, $x_{(2,6)3}^L = 40$ |
| 3 | (0, 1) | 45 | $x_{(0,1)2}^L = 45$, $x_{(0,1)3}^L = 45$, $x_{(1,4)2}^L = 45$, $x_{(1,4)3}^L = 45$ |

The first iteration has been already explained above. At the second iteration, link (0, 2) is the bottleneck. This led to fixing all decision allocations on link (0, 2) as well as on links (2, 5)

and (2, 6). Note that the capacity of link (0, 2) is fully used while only 70 units of capacity are used on each of the links (2, 5) and (2, 6). In iteration 3, link (0, 1) is the bottleneck link. Recall that allocation $x_{(0,1)1}^L=30$ has already been fixed at iteration 1. At iteration 3, the allocations of programs 2 and 3 are fixed on link (0, 1). In addition, allocations of programs 2 and 3 are also fixed on link (1, 4). Note that the capacities on links (0, 1), (0, 2) and (1, 3) is fully used, while spare capacities are available on links (1, 4), (1, 5) and (1, 6). The spare capacities result from the ordering constraints that must be satisfied.

Various extensions can readily be handled by the current invention, using the DISTRIBUTED METHOD FOR EBAM.

Consideration of Upper Bounds on Bandwidth Allocation

Consider Problem EBAM with additional constraints that impose upper bounds on the bandwidth allocation decision variables; thus adding the following constraints to the formulation of Problem EBAM:

$$x_{(i,j)p} \leq U_p, \text{ for all } [(i,j),p] \in LP, \quad (2.5)$$

where the $U_p$'s are the upper bound parameters. Consider Problem SLBAM-(i,j) with added upper bound constraints $x_{(i,j)p} \leq U_p$. The upper bounds are handled by first solving the problem without the upper bounds. The maximin objective value with upper bounds, referred to as $V_{(i,j)}^{UB}$, is computed as $V_{(i,j)}^{UB} = \min[V^*_{(i,j)}, \min_{p \in D_{(i,j)}} F_p(U_p)]$. Consider now Step 203 in FIG. 2 and suppose at some iteration link $(i_0, j_0)$ is selected as the bottleneck link. If $V_{(i_0,j_0)}^{UB} = V^*_{(i_0,j_0)}$, none of the variables associated with link $(i_0, j_0)$ exceeded the upper bound, and all variables at link $(i_0, j_0)$ are fixed as specified in Step 204 of FIG. 2. Otherwise, $$V_{(i_0,j_0)}^{UB} = \min_{p \in D_{(i_0,j_0)}} F_p(U_p)$$

and only the variables whose performance function value is equal to $V_{(i_0,j_0)}^{UB}$ are fixed at their optimal value in Step 204 (these variables are, thus, fixed, at their upper bound). Steps 205 and 206 are then executed only for programs that were fixed on the bottleneck link. Note that the updated sets $D_{(i,j)}$ (including for the bottleneck link and for links below the bottleneck) may not be empty.

Multiple Trees

Consider a network with multiple servers, where each of the servers broadcasts multiple programs on a specified tree network that is part of the overall network. The same program may be broadcasted from multiple servers where the demand for a specific program at a given node is served by a designated server. Thus, the input of requested programs at a node specifies for each of the programs its supplying server. Note that each of the network links may carry programs broadcasted from different servers. This model is described in H. Luss, An Equitable Bandwidth Allocation Model for Video-on-Demand Networks, *Networks and Spatial Economics* 8, 23-41, 2008. (Also, H. Luss, Bandwidth Allocation for Video-on-Demand Networks, U.S. Pat. No. 7,664,020). The Distributed Method for EBAM can be applied with very minor modifications to a network comprised of multiple trees. Specifically, even in the absence of upper bounds, the updated set $D_{(i,j)}$, determined in step 205 for links below the bottleneck link, may not be empty since these links may carry programs from servers whose broadcasting trees do not include the bottleneck link.

Optimal Decisions in a Dynamic Environment

The distributed algorithm for Problem EBAM was described in a static setting. In practice, the problem changes over time. For example, the set of requested programs at various nodes may change, new programs may be added to the server while other programs may be deleted, available capacity on various links may change, etc. Whenever a change occurs, the distributed algorithm must be re-solved.

Consider the example in FIG. 1. Suppose a request for program 4 is added to the set $P_3$ at node 3. The method, as described in FIG. 2, must be re-executed, though some of the computations need not be re-done. Since the set $P_3$ changed, the sets $D_{(1,3)}$ and $D_{(0,1)}$ in step 201 would change while all other sets $D_{(i,j)}$ remain unchanged. Hence, the distributed computations in step 202 are re-executed only for links (1, 3) and (0, 1). Note that even a local change of adding a program at some node may affect the order of bottleneck links and change the optimal bandwidth allocated to programs on other links. The table below provides the new solution. In our example, the order of bottleneck links has not changed. However, optimal allocations have changed not only on the links that now carry program 4 to satisfy the request at node 3, but also on link (1, 4) due to the reduced allocation on link (0, 1) for programs 2 and 3.

TABLE 2

| iteration | Bottleneck link $(i_0, j_0)$ | Bottleneck Link Solution $V_{(i_0,j_0)}^*$ | Optimal Allocation Decisions |
|---|---|---|---|
| 1 | (1, 3) | 13.33 | $x_{(1,3)1}^L = 30$, $x_{(1,3)3}^L = 13.33$, $x_{(1,3)4}^L = 6.66$ |
| 2 | (0, 2) | 40 | $x_{(0,1)1}^L = 30$, $x_{(0,1)4}^L = 6.66$ $x_{(0,2)1}^L = 30$, $x_{(0,2)2}^L = 40$, $x_{(0,2)3}^L = 40$, $x_{(0,2)4}^L = 20$, $x_{(2,5)1}^L = 30$, $x_{(2,5)2}^L = 40$, $x_{(2,6)1}^L = 30$, $x_{(2,6)3}^L = 40$ |
| 3 | (0, 1) | 41.66 | $x_{(0,1)2}^L = 41.66$, $x_{(0,1)3}^L = 41.66$, $x_{(1,4)2}^L = 41.66$, $x_{(1,4)3}^L = 41.66$ |

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on general-purpose computers or computer system. The computer systems may be any type of known or will be known systems and may typically include a processor, memory device, a storage device, input/output devices, internal buses, and/or a communications interface for communicating with other computer systems in conjunction with communication hardware and software, etc. A module may be a component of a device, software, program, or system that implements some "functionality", which can be embodied as software, hardware, firmware, electronic circuitry, or etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server, and/or embedded system.

While there has been described and illustrated a distributed method for equitable bandwidth allocation in a network, it will be apparent to those skilled in the art that modifications and variations are possible without deviating from the principles and broad teachings of the present invention which shall be limited solely by the scope of the claims appended hereto.

What is claimed is:

1. A distributed method for determining equitable bandwidth allocations in a content distribution tree network of nodes and interconnecting links comprising the steps of:

performing computations at each of the nodes independently while only minimal information is exchanged among the nodes where the root of the tree has a server that broadcasts multiple programs throughout the tree; and defining the equitable bandwidth allocation problem by Problem EBAM comprising the lexicographic maximin optimization problem $$V^{LEX} = lexmax_x[F^{(NP)}(x)]$$

so that $$F^{(NP)}(x) = [F_{p_1}(x_{(i_1,j_1)p_1}), F_{p_2}(x_{(i_2,j_2)p_2}), F_{p_3}(x_{(i_3,j_3)p_3}), \ldots ],$$

where $$F_{p_1}(x_{(i_1,j_1)p_1}) \leq F_{p_2}(x_{(i_2,j_2)p_2}) \leq F_{p_3}(x_{(i_3,j_3)p_3}) \leq \ldots$$

are satisfied, and $$\sum_{p \in D_{(i,j)}} x_{(i,j)p} \leq c(i, j), \text{ for all } (i, j) \in A$$

$$x_{(i,j)p} \geq x_{(j,k)p}, \text{ for all } k \in SUC(j) \text{ and}$$

$$p \in D_{(j,k)}, \text{ for all } [(i, j), p] \in LP$$

$$x_{(i,j)p} \geq B_p, \text{ for all } [(i, j), p] \in LP$$

where $x_{(i,j)p}$ = Bandwidth allocated on link (i, j) for program p where $x_{(i,j)p}$ is continuous, and $x_{(i,j)p} \geq B_p$ where $B_p$ is a lower bound for bandwidth required by program p x = Vector of decision variables $x_{(i,j)p}$, (j, p)∈NP
NP = a set of all program-node pairs
c(i,j) = a capacity limit of available bandwidth of link (i,j)
A = set of interconnecting directed links
$D_{(i,j)}$ = set of programs that are carried on link (i,j)
SUC(j) = the set of immediate successor nodes of node j
LP = a set of all program-link pairs
$F_{jp}(x_{(i,j)p})$ = Performance function associated with program p requested at node j, where $x_{(i,j)p}$ is the bandwidth allocated to program p on link (i, j) and, hence, into node j and the distributed method for determining equitable bandwidth allocations among plurality of programs on each link of the network is specified by the Distributed Method for EBAM comprising the steps of:

a. computing sets of programs that will be carried on each link of the network wherein set computations are done recursively starting at the leaf nodes of the tree network and moving upwards along the tree nodes;

b. computing temporary equitable bandwidth allocation at each node for each outgoing link from that node among plurality of programs carried on the outgoing link, independently from computations executed at other nodes, where the allocation among plurality of programs at link (i, j) is computed by solving a single link association problem Problem SLBAM-(i, j) comprising $$V^*_{(i,j)} = \max_{x_{(i,j)}} \left[ \min_{p \in D_{(i,j)}} F_p(x_{(i,j)p}) \right]$$

so that $$\sum_{p \in D_{(i,j)}} x_{(i,j)p} \leq c(i, j)$$

$$x_{(i,j)p} \geq B_p, \text{ for all } p \in D_{(i,j)}$$

c. determining bottleneck link in the tree network through recursive computations, starting computations from the leaf nodes and moving upwards along the tree nodes;

d. determining final equitable bandwidth allocations to programs carried on the bottleneck link;

e. determining final equitable bandwidth allocations to programs on links that are included in the subtree whose root node is the head node of the bottleneck link;

f. determining final equitable bandwidth allocations to programs on links that are included on the path connecting the root node of the tree network to the tail node of the bottleneck link; and g. proceeding with a new iteration with distributed computations, starting at step b with computing new temporary equitable bandwidth allocations for some links, wherein the method terminates once final equitable allocation decisions for all programs on all links are made.

2. The method as set forth in claim 1, further comprising solving Problem EBAM with a lexicographic maximin objective function comprising a plurality of performance functions, one for each program-node combination, where the performance functions are continuous and strictly increasing functions, and for any specific program the performance functions are the same at all nodes.

3. The method as set forth in claim 1, further comprising solving Problem EBAM with a bandwidth capacity constraint on each link such that the sum of the allocated bandwidths of all of the programs carried on the link does not exceed the available bandwidth capacity of the link.

4. The method as set forth in claim 1, further comprising solving Problem EBAM by enforcing constraints that allocated bandwidth for each program carried on a link cannot be below a specified lower bound and that the allocated bandwidth for each program can be decreased but not increased from one link to the next link along a path from the root node of the tree to a destination node.

5. The method as set forth in claim 1, further comprising solving Problem EBAM with additional upper bounds imposed on allocated bandwidth for each program carried on a link using the Distributed Method for EBAM.

6. The method as set forth in claim 1, further comprising solving Problem EBAM for a network having multiple trees where a server at the root of each tree broadcasts multiple programs and the different trees share links, where the equitable solution is obtained by the Distributed Method for EBAM.

7. The method as set forth in claim 1 further comprising repeatedly applying the Distributed Method for EBAM to compute a new equitable solution when some input parameters change in a dynamic environment.

8. A computer readable medium having computer readable program code for operating on a computer for determining equitable bandwidth allocations in a content distribution tree network of nodes and interconnecting links comprising the steps of:

performing computations at each of the nodes independently while only minimal information is exchanged among the nodes where the root of the tree has a server that broadcasts multiple programs throughout the tree; and defining the equitable bandwidth allocation problem by Problem EBAM comprising the lexicographic maximin optimization problem $$V^{LEX} = \operatorname*{lexmax}_{x}[F^{(NP)}(x)]$$

so that $$F^{(NP)}(x) = [F_{p_1}(x_{(i_1,j_1)p_1}), F_{p_2}(x_{(i_2,j_2)p_2}), F_{p_3}(x_{(i_3,j_3)p_3}), \ldots ],$$

where $$F_{p_1}(x_{(i_1,j_1)p_1}) \leq F_{p_2}(x_{(i_2,j_2)p_2}) \leq F_{p_3}(x_{(i_3,j_3)p_3}) \leq \ldots$$

are satisfied, and $$\sum_{p \in D_{(i,j)}} x_{(i,j)p} \leq c(i,j), \text{ for all } (i,j) \in A$$

$$x_{(i,j)p} \geq x_{(j,k)p}, \text{ for all } k \in SUC(j) \text{ and }$$
$$p \in D_{(j,k)}, \text{ for all } [(i,j), p] \in LP$$

$$x_{(i,j)p} \geq B_p, \text{ for all } [(i,j), p] \in LP$$

where $x_{(i,j)p}$=Bandwidth allocated on link (i, j) for program p where $x_{(i,j)p}$ is continuous, and $x_{(i,j)p} \geq B_p$ where $B_p$ is a lower bound for bandwidth required by program p x=Vector of decision variables $x_{(i,j)p}$, (j, p)∈NP
NP=a set of all program-node pairs
c(i,j)=a capacity limit of available bandwidth of link (i,j)
A=set of interconnecting directed links
$D_{(i,j)}$=set of programs that are carried on link (i,j)
SUC(j)=the set of immediate successor nodes of node j
LP=a set of all program-link pairs
$F_{jp}(x_{(i,j)p})$=Performance function associated with program p requested at node j, where $x_{(i,j)p}$ is the bandwidth allocated to program p on link (i, j) and, hence, into node j and the distributed method for determining equitable bandwidth allocations among plurality of programs on each link of the network is specified by the Distributed Method for EBAM, comprising the steps of:

a. computing sets of programs that will be carried on each link of the network wherein set computations are done recursively starting at the leaf nodes of the tree network and moving upwards along the tree nodes;

b. computing temporary equitable bandwidth allocation at each node for each outgoing link from that node among each plurality of programs carried on the outgoing link, independently from computations executed at other nodes, where the allocation among plurality of programs at link (i, j) is computed by solving a single link association problem Problem SLBAM-(i, j) comprising $$V^*_{(i,j)} = \max_{x_{(i,j)}} \left[ \min_{p \in D_{(i,j)}} F_p(x_{(i,j)p}) \right]$$

so that $$\sum_{p \in D_{(i,j)}} x_{(i,j)p} \leq c(i,j)$$

$$x_{(i,j)p} \geq B_p, \text{ for all } p \in D_{(i,j)}$$

c. determining bottleneck link in the tree network through recursive computations, starting computations from the leaf nodes and moving upwards along the tree nodes;

d. determining final equitable bandwidth allocations to programs carried on the bottleneck link;

e. determining final equitable bandwidth allocations to programs on links that are included in the subtree whose root node is the head node of the bottleneck link;

f. determining final equitable bandwidth allocations to programs on links that are included on the path connecting the root node of the tree network to the tail node of the bottleneck link; and g. proceeding with a new iteration with distributed computations, starting at step b with computing new temporary equitable bandwidth allocations for some links, wherein the method terminates once final equitable allocation decisions for all programs on all links are made.

9. The computer readable program code according to claim 8, further comprising solving Problem EBAM with a lexicographic maximin objective function comprising a plurality of performance functions, one for each program-node combination, where the performance functions are continuous and strictly increasing functions, and for any specific program the performance functions are the same at all nodes.

10. The computer readable program code according to claim 8, further comprising solving Problem EBAM with a bandwidth capacity constraint on each link such that the sum of the allocated bandwidths of all of the programs carried on the link does not exceed the available bandwidth capacity of the link.

11. The computer readable program code according to claim 8, further comprising solving Problem EBAM by enforcing constraints that allocated bandwidth for each program carried on a link cannot be below a specified lower bound and that the allocated bandwidth for each program can be decreased but not increased from one link to the next link along a path from the root node of the tree to a destination node.

12. The computer readable program code according to claim 8, further comprising solving Problem EBAM with additional upper bounds imposed on allocated bandwidth for each program carried on a link using the Distributed Method for EBAM.

13. The computer readable program code according to claim 8, further comprising solving Problem EBAM for a network having multiple trees where a server at the root of each tree broadcasts multiple programs and the different trees share links, where the equitable solution is obtained by the Distributed Method for EBAM.

14. The computer readable program code according to claim 8, further comprising repeatedly applying the Distributed Method for EBAM to compute a new equitable solution when some input parameters change in a dynamic environment.

15. A system for determining equitable bandwidth allocations in a content distribution tree of and interconnecting links comprising:

means for performing computations at each of the nodes independently while only minimal information is exchanged among the nodes where the root of the tree has a server that broadcasts multiple programs throughout the tree; and means for defining the equitable bandwidth allocation problem by Problem EBAM comprising the lexicographic maximin optimization problem $$V^{LEX} = lex\max_{x}[F^{(NP)}(x)]$$

so that $$F^{(NP)}(x) = [F_{p_1}(x_{(i_1,j_1)p_1}), F_{p_2}(x_{(i_2,j_2)p_2}), F_{p_3}(x_{(i_3,j_3)p_3}), \ldots],$$

where $$F_{p_1}(x_{(i_1,j_1)p_1}) \leq F_{p_2}(x_{(i_2,j_2)p_2}) \leq F_{p_3}(x_{(i_3,j_3)p_3}) \leq \ldots$$

are satisfied, and $$\sum_{p \in D_{(i,j)}} x_{(i,j)p} \leq c(i,j), \text{ for all } (i,j) \in A$$

$x_{(i,j)p} \geq x_{(j,k)p}$, for all $k \in SUC(j)$ and $p \in D_{(j,k)}$, for all $[(i,j), p] \in LP$ $x_{(i,j)p} \geq B_p$, for all $[(i,j), p] \in LP$ where $x_{(i,j)p}$=Bandwidth allocated on link (i, j) for program p where $x_{(i,j)p}$ is continuous, and $x_{(i,j)p} \geq B_p$ where $B_p$ is a lower bound for bandwidth required by program p x=Vector of decision variables $x_{(i,j)p}$, (j, p)∈NP
NP=a set of all program-node pairs
c(i,j)=a capacity limit of available bandwidth of link (i,j)
A=set of interconnecting directed links
$D_{(i,j)}$=set of programs that are carried on link (i,j)
SUC(j)=the set of immediate successor nodes of node j
LP=a set of all program-link pairs $F_{jp}(x_{(i,j)p})$=Performance function associated with program p requested at node j, where $x_{(i,j)p}$ is the bandwidth allocated to program p on link (i, j) and, hence, into node j and the distributed method for determining equitable bandwidth allocations among plurality of programs on each link of the network is specified by the Distributed Method for EBAM, comprising the steps of a. computing sets of programs that will be carried on each link of the network wherein set computations are done recursively starting at the leaf nodes of the tree network and moving upwards along the tree nodes;

b. computing temporary equitable bandwidth allocation at each node for each outgoing link from that node among plurality of programs carried on the outgoing link, independently from computations executed at other nodes, where the allocation among plurality of programs at link (i, j) is computed by solving a single link association problem Problem SLBAM-(i, j) comprising $$V^*_{(i,j)} = \max_{x_{(i,j)}} \left[ \min_{p \in D_{(i,j)}} F_p(x_{(i,j)p}) \right]$$

so that $$\sum_{p \in D_{(i,j)}} x_{(i,j)p} \leq c(i,j)$$

$x_{(i,j)p} \geq B_p$, for all $p \in D_{(i,j)}$ c. determining bottleneck link in the tree network through recursive computations, starting computations from the leaf nodes and moving upwards along the tree nodes;

d. determining final equitable bandwidth allocations to programs carried on the bottleneck link;

e. determining final equitable bandwidth allocations to programs on links that are included in the subtree whose root node is the head node of the bottleneck link;

f. determining final equitable bandwidth allocations to programs on links that are included on the path connecting the root node of the tree network to the tail node of the bottleneck link; and g. proceeding with a new iteration with distributed computations, starting at step b with computing new temporary equitable bandwidth allocations for some links, wherein the method terminates once final equitable allocation decisions for all programs on all links are made.

* * * * *